(12) United States Patent
Czainski et al.

(10) Patent No.: US 9,744,869 B2
(45) Date of Patent: Aug. 29, 2017

(54) ELECTRIC POWER SUPPLY SYSTEM, VEHICLE AND METHOD OF OPERATING A VEHICLE

(71) Applicant: Bombardier Transportation GmbH, Berlin (DE)

(72) Inventors: Robert Czainski, Szczecin (PL); Michael Mollers, Escheburg (DE)

(73) Assignee: Bombardier Transportation GmbH, Berlin (DE)

( * ) Notice: Subject to any disclaimer, the term of this patent is extended or adjusted under 35 U.S.C. 154(b) by 327 days.

(21) Appl. No.: 14/409,208

(22) PCT Filed: Jul. 3, 2013

(86) PCT No.: PCT/EP2013/063990
§ 371 (c)(1),
(2) Date: Dec. 18, 2014

(87) PCT Pub. No.: WO2014/006072
PCT Pub. Date: Jan. 9, 2014

(65) Prior Publication Data
US 2015/0165914 A1    Jun. 18, 2015

(30) Foreign Application Priority Data
Jul. 3, 2012  (GB) .................................. 1211864.2

(51) Int. Cl.
*B60L 11/18*    (2006.01)
(52) U.S. Cl.
CPC ............. *B60L 11/182* (2013.01); *B60L 11/18* (2013.01); *B60L 11/1812* (2013.01);
(Continued)

(58) Field of Classification Search
CPC .................................................. B60L 11/812
(Continued)

(56) References Cited

U.S. PATENT DOCUMENTS

| 5,504,414 A | 4/1996 | Kinoshita |
| 6,421,600 B1 | 7/2002 | Ross |

(Continued)

FOREIGN PATENT DOCUMENTS

| CN | 101420184 A | 4/2009 |
| CN | 102165669 A | 8/2011 |

(Continued)

*Primary Examiner* — Thuan Do
(74) *Attorney, Agent, or Firm* — The Webb Law Firm

(57) ABSTRACT

Disclosed is an electric power supply system, vehicle and method of operating a vehicle, wherein an electrical power supply system, in particular a traction system, of a vehicle, includes an energy storage module, an inverter, an electric machine, a receiving device adapted to receive an alternating electromagnetic field and to produce an alternating electric current by electromagnetic induction, and a passive electric circuit arrangement adapted to connect the inverter, the electric machine, and the receiving device, wherein the passive electric circuit arrangement includes a first transmission circuit for transferring electric energy between the receiving device and the electric machine, a second transmission circuit for transferring electric energy between the receiving device and the inverter, and a third transmission circuit for transferring electric energy between the inverter and the electric machine, wherein the passive electric circuit arrangement is designed such that at a given charging frequency, an impedance provided by the first transmission circuit is higher than a predetermined first blocking impedance and an impedance provided by the second transmission circuit is lower than a predetermined second passing impedance.

18 Claims, 2 Drawing Sheets

(52) U.S. Cl.
CPC ....... *B60L 2200/18* (2013.01); *B60L 2200/26* (2013.01); *B60L 2200/30* (2013.01); *B60L 2220/12* (2013.01); *B60L 2220/14* (2013.01); *Y02T 10/7005* (2013.01); *Y02T 10/7072* (2013.01); *Y02T 90/122* (2013.01); *Y02T 90/127* (2013.01); *Y02T 90/14* (2013.01); *Y10T 29/49117* (2015.01)

(58) Field of Classification Search
USPC .......................................................... 320/108
See application file for complete search history.

(56) References Cited

U.S. PATENT DOCUMENTS

| | | | |
|---|---|---|---|
| 6,879,889 | B2 | 4/2005 | Ross |
| 2009/0034308 | A1 | 2/2009 | Welchko et al. |
| 2011/0231029 | A1 | 9/2011 | Ichikawa et al. |
| 2012/0025756 | A1 | 2/2012 | Xu et al. |
| 2012/0032633 | A1 | 2/2012 | Cordes et al. |
| 2012/0098348 | A1 | 4/2012 | Inoue et al. |
| 2014/0159481 | A1* | 6/2014 | Berger .................. H02M 7/493 307/10.1 |

FOREIGN PATENT DOCUMENTS

| | | |
|---|---|---|
| CN | 201936969 U | 8/2011 |
| CN | 102396131 A | 3/2012 |
| EP | 0553824 A1 | 8/1993 |
| EP | 1610450 A2 | 12/2005 |
| JP | 54039817 | 3/1979 |
| JP | 630505 A | 2/1994 |
| JP | 9322412 A | 12/1997 |
| JP | 10146060 A | 5/1998 |
| JP | 2001211690 A | 8/2001 |
| JP | 201265537 A | 3/2012 |
| RU | 2408476 C2 | 1/2011 |
| RU | 2411142 C2 | 2/2011 |
| WO | 2010031595 A2 | 3/2010 |

\* cited by examiner

State of the art

ELECTRIC POWER SUPPLY SYSTEM, VEHICLE AND METHOD OF OPERATING A VEHICLE

CROSS-REFERENCE TO RELATED APPLICATIONS

This application is the United States national phase of International Application No. PCT/EP2013/063990 filed Jul. 3, 2013, and claims priority to United Kingdom Patent Application No. 1211864.2 filed Jul. 3, 2012, the disclosures of which are hereby incorporated in their entirety by reference.

BACKGROUND OF THE INVENTION

Field of the Invention

The invention relates to an electric power supply system, in particular a traction system, of a vehicle, in particular a track bound vehicle and/or a road automobile, with electric energy, wherein the system comprises a receiving device adapted to receive an alternating electromagnetic field and to produce an alternating electric current by electromagnetic induction (i.e. magnetic induction which is caused by an electromagnetic field and the induction produces electric energy), an inverter adapted to convert an alternating current into a direct current, an electric machine adapted to propel the vehicle, and an passive electric circuit arrangement adapted to connect the inverter, the electric machine, and the receiving device.

Furthermore, the invention relates to a vehicle comprising the arrangement. The invention also relates to a method of manufacturing the vehicle and to a method of operating the vehicle.

Description of Related Art

WO 2010/031595 A2 discloses an arrangement for providing a vehicle, in particular a track bound vehicle, with electric energy, wherein the arrangement comprises a receiving device adapted to receive an alternating electromagnetic field and to produce an alternating electric current by electromagnetic induction. The receiving device comprises a plurality of windings and/or coils of electrically conducting material, wherein each winding or coil is adapted to produce a separate phase of the alternating electric current.

SUMMARY OF THE INVENTION

The present invention can be applied to any land vehicle (including, but not preferably, any vehicle which is only temporarily on land), in particular track bound vehicles, such as rail vehicles (e.g. trams), but also to road automobiles, such as individual (private) passenger cars or public transport vehicles (e.g. busses, including trolleybuses which are also track bound vehicles). Preferably, the primary side conductor arrangement which produces the alternating electromagnetic field is integrated in the track or road of the vehicle so that the electric lines of the primary side conductor arrangement extend in a plane which is nearly parallel to the surface of the road or track on which the vehicle may travel. As also described by WO 2010/031595 A2, the receiving device can be located at the underside of a vehicle and may be covered by a ferromagnetic body, such as a body in the shape of a slab or plate. A suitable material is ferrite. The body bundles and redirects the field lines of the magnetic field and therefore reduces the field intensity above the body to nearly zero. However, other configurations, locations and/or orientations of the primary side conductor arrangement are possible. For example, the primary side conductor arrangement may be located sideways of the vehicle.

In any case, the gap between the primary side conductor arrangement and the at least one inductance of the receiving device should be as small as possible, since the efficiency of the wireless energy transfer between primary and secondary side is smaller for larger gaps. For the same reason, the voltage which is induced in the at least one inductance depends on the size of the gap. One way to handle the varying voltage on the secondary side of the system is to supply the electric energy to power consumers only, which are voltage-tolerant, i.e. can be operated in a wide range of voltages.

Another example, to which the present invention can be applied, is the traction system of a rail vehicle which comprises power supply network connecting the receiving device to an inverter which inverts an alternating output current of the receiving device into a direct current for charging an energy storage module, e.g. a traction battery. The inverter can also invert a direct current to an alternating current for operating at least one traction motor of the vehicle. Therefore, the power supply network can also connect the inverter to the traction motor of the vehicle. In this case, however, there can be a current flow from the receiving device to the traction motor via the electric power supply system which can cause an undesired operation of the traction motor and thus an undesired movement of the vehicle. For example, during static charging, the receiving device generates an alternating output current to charge a traction battery while the vehicle is at a halt.

U.S. Pat. No. 6,879,889 B2 discloses a roadway-powered electric vehicle comprising: a vehicle frame supported by front and rear suspension systems, including front and rear wheels; an onboard power receiving module mounted on underneath side of said vehicle frame that receives electrical power coupled thereto from a roadway power transmitting module embedded in a roadway over which the EV travels; an onboard energy storage means for storing and delivering electrical energy, said onboard energy storage means exhibiting a specific power of at least 5 kW/kg; an electric drive means coupled to at least one of said front or rear suspension systems for driving said front and rear wheels; an onboard power controller means for receiving electrical power from said on-board power module and directing it to said energy storage means, and for selectively delivering electrical energy from said energy storage means to said electric drive means in order to provide operating power for said EV; and a location determining system for determining a location of the roadway powered electric vehicle and for generating a location signal in response thereto. The current flow within a traction system is directed by the means of actively controlled switches. The switches may be electrical relays, solid state switches, SCR's, and diodes. A disadvantage of the proposed solution is that a control of the energy flow or current flow in a charging mode or an operation mode of the vehicle is an active control, wherein the switching processes increase the complexity of the control and switching losses are generated.

It is an object of the present invention to provide an electrical power supply system, in particular a traction system, of a vehicle which reduces a complexity of controlling an energy or current flow during a charging mode and an operation mode while also reducing an energy loss. Further objects of the invention are to provide a vehicle which comprises the arrangement, a method of operating the vehicle and a method of manufacturing the vehicle.

It is a basic idea of the invention to use a passive electric circuit arrangement to connect the different elements of an electric power supply system, in particular a traction system, of a vehicle which directs an energy flow or current flow during a charging mode and an operation mode while eliminating switching operations and reducing an energy loss.

An electrical power supply system, in particular a traction system, of a vehicle is proposed. The electrical power supply system can be used to transfer electric energy between an energy storage module (e.g. an electrochemical storage), for example a traction battery, and an electric machine, for example a traction motor, which can be used for propelling the vehicle.

In particular, the electrical power supply system comprises an inverter and the electric machine. The electric machine is used, in particular, for propelling the vehicle. For example, the electric machine can be operated in a motor mode and in an optional generator mode. In the motor mode, the electric machine transforms electric energy to mechanical energy used, in particular, for propelling the vehicle. In the generator mode, the electric machine transforms mechanical energy provided by the moving vehicle to electric energy. The transformation in the generator mode can also be referred to as recuperation. It is therefore possible to charge the energy storage module by operating the electric machine in the generator mode. The electric machine can be a three-phase-motor, e.g. an asynchronous machine or a synchronous machine.

Furthermore, the electrical power supply system comprises a receiving device (typically named: pickup) adapted to receive an alternating electromagnetic field and to produce and alternating electric current by electromagnetic induction. The receiving device provides a secondary side of a transformer, wherein a primary side of transformer can be provided by electric lines embedded into a track (e.g. a roadway) on which the vehicle travels. The receiving device is used to transfer electric energy from the trackside to the vehicle by the means of magnetic induction. Electric energy can be transferred from the trackside to the vehicle while the vehicle is moving relative to the track and/or while the vehicle is at a rest or at a halt. The transfer of electric energy to the storage while the vehicle is at a halt is also called static charging. It is possible that the energy storage module is exclusively chargeable by electric energy generated by the receiving device. This can be the case if the electric machine cannot be operated in a generator mode.

The inverter can be electrically connected to the energy storage module. In a charging mode of the vehicle, the inverter transforms an alternating current, which is e.g. generated by a receiving device, to a direct current which is used to charge the energy storage module. An operating mode of the vehicle can comprise the motor mode and the generator mode. In the motor mode, electric energy is transferred from the energy storage module to an electric machine and the inverter transforms a direct current provided by the energy storage module to an alternating current which is used to operate the electric machine. In the generator mode, electric energy is transferred from the electric machine to the energy storage module and the inverter transforms an alternating current provided by the electric machine to a direct current which can be used to charge the energy storage module. The inverter can be a 3-phase-inverter that produces a 3-phase alternating current.

Furthermore, the electrical power supply system comprises a passive electric circuit arrangement adapted to electrically connect the inverter, the electric machine, and the receiving device. A passive electric circuit comprises exclusively passive electrical elements such as inductive elements and/or capacitive elements. The term "passive electrical element" means that no external electric energy is used for operating the passive element. In contrast, an active electrical element, such as a field-effect-transistor, needs electric energy for an operation. The passive electric circuit arrangement can be also adapted to connect the inverter to the energy storage module.

For example, an energy storage module can be electrically connected to an output (in particular the DC-side) of the inverter. An input (in particular the AC-side) of the inverter can be electrically connected to an output of the receiving device. Additionally, the input of the inverter can be electrically connected to an input of the electric machine. Within such an arrangement, the output of the receiving device is also electrically connected to the input of the electric machine.

The passive electric circuit arrangement comprises a first transmission circuit for transferring electric energy between the receiving device and the electric machine. Furthermore, the passive electric circuit arrangement comprises a second transmission circuit for transferring electric energy between the receiving device and the inverter. Furthermore, the passive electric circuit arrangement comprises a third transmission circuit for transferring electric energy between the inverter and the electric machine. The first, the second, and the third transmission circuits are parts of the passive electric circuit arrangement. It is possible that a part of the first transmission circuit is also a part of the second and/or the third transmission circuit. Similarly, a part of the second transmission circuit can be a part of the first and/or the third transmission circuit. Also, a part of the third transmission circuit can be a part of the first and/or second transmission circuit. The transmission circuits can alternatively be named "transmission paths", since they provide a path for energy transmission, although some of the paths may block the transmission of the major part of power, at least in a specific operation mode. E.g. the first transmission circuit may block the transmission of the major part of power provided by the receiving device directly to the electric machine.

The electric connections provided by the passive electric circuit arrangement can be direct electric connections, e.g. with no additional electrical elements arranged between the inverter and the receiving device, or electric connections comprising one or more additional electrical elements, e.g. inductive and/or capacitive elements, such as inductors or capacitors.

In particular, the passive electric circuit arrangement is designed such that at a given charging frequency, an impedance provided by the first transmission circuit is higher than a predetermined first blocking impedance and an impedance provided by the second transmission circuit is lower than a predetermined second passing impedance. The first blocking impedance denotes a predetermined impedance of the first circuit. In the following, the term "first blocking or passing impedance" refers to an impedance of the first transmission circuit whereas the term "second blocking or passing impedance" refers to an impedance of the second transmission circuit. As detailed below, the term "third blocking or passing impedance" refers to an impedance of the third transmission circuit.

The charging frequency denotes the frequency of the alternating electric current provided by the receiving device during the transfer of electric energy in a charging process, in particular during static charging. In particular, the charging frequency is given by the electric properties of the receiving device and/or by the frequency of the electromagnetic field which is received by the receiving device. In particular if the charging frequency is given by a resonance frequency of the receiving device, optionally including other components of the arrangement, the given charging frequency can also be called "inherent charging frequency". For example, the charging frequency can be 20 kHz. At this frequency, the electrical elements arranged between the output of the receiving device and the input of the electrical machine provide a certain impedance. This impedance is higher than the predetermined first blocking impedance. Preferably, the first blocking impedance is chosen such that an input current of the electric machine is smaller than a predetermined input current, in particular as small as possible, preferably 0 or approximately 0.

Therefore, the first blocking impedance should be chosen as a high impedance. At the same time, however, the impedance provided by the electrical elements arranged between the output of the receiving device and the input of the inverter, e.g. the impedance provided by the electrical elements comprised by the second transmission circuit, is lower than a predetermined second passing impedance. Preferably, the second passing impedance should be chosen such that an electric input current of the inverter is higher than a predetermined input current, preferably as high as possible. Therefore, the passing impedance should be chosen as a low impedance. In any case, the first blocking impedance is higher than the second passing impedance, preferably higher by a factor of at least 100 or even by a factor of at least 1000. In practice, the first blocking impedance and the second passing impedance (and any other predetermined impedances, such as the third passing impedance, see below) are defined by the electric properties (in particular the capacitances, inductances and/or ohmic resistances) of the power supply system, including the receiving device, the inverter, the electric machine and the passive electric circuit arrangement.

The passive electric circuit arrangement therefore provides a passive switching network between the receiving device, the inverter, and the electric machine. During the process of static charging, the passive electric circuit arrangement prevents an electric current from flowing from the receiving device to the electric machine while directing the electric current to the inverter. Thus, the electric energy transferred during static charging is mainly, preferably exclusively, transferred to the inverter. Advantageously, no active elements such as active switches, e.g. field-effect-transistors, electrical relays or solid state switches, are necessary to provide the desired current flow. The passive electric circuit arrangement also prevents the vehicle from an undesired movement during static charging because the electric current flowing to the electric machine is minimized.

In another embodiment, the passive electric circuit arrangement is designed such that at a given operating frequency, an impedance provided by the third transmission circuit is lower than a predetermined third passing impedance. The operating frequency denotes a frequency of an alternating current provided by the inverter during motor operation or a frequency of an alternating current provided by the electric machine during generator operation.

It is possible that the passive electric circuit arrangement is designed such that each frequency of an interval of operating frequencies, the impedance provided by the third transmission circuit is lower than the predetermined third passing impedance. The operating frequency/frequencies is/are usually smaller than the charging frequency. For example, the operating frequency can range from 0 kHz to 10 kHz.

In this embodiment, the electrical elements arranged between the inverter and the electric machine (in particular including the electric properties of the machine, e.g. the inherent inductance of the machine) are chosen such that an impedance provided by these elements is smaller than the third passing impedance at the given operating frequency or at the given operating frequencies. This advantageously allows a current to flow from the inverter to the electric machine during the motor mode and an electric current to flow from the electric machine to the inverter during generator mode. The third passing impedance can be equal to the second passing impedance. Alternatively, a deviation between the second passing impedance and the third passing impedance may be smaller than 50% of the smaller one of the two impedances, preferably smaller than 20% of the smaller one of the two impedances. In any case, it is preferred that the first blocking impedance is higher than the third passing impedance, preferably higher by a factor of at least 100 or even by a factor of at least 1000. Preferably, the third passing impedance is chosen such that a current flowing from the inverter to the electric machine and/or a current flowing from the electric machine to the inverter is higher than a predetermined current. Preferably, the third passing impedance is chosen as a low impedance.

In a further embodiment, the passive electric circuit arrangement is designed such that at a given operating frequency (in particular the given operating frequency or one of the given operating frequencies mentioned in the paragraphs before), an impedance provided by the second transmission circuit is higher than a predetermined second blocking impedance. In this case, the electrical elements arranged between the inverter and an output of the receiving device, are chosen such that the impedance provided by these elements is higher than a pre-determined second blocking impedance. Preferably, the second blocking impedance is chosen such that a current flowing from the inverter to the receiving device is small, preferably zero or approximately 0. Therefore, the second blocking impedance is chosen as a high impedance. In any case, it is preferred that the second blocking impedance is higher than the second passing impedance and/or the third passing impedance, preferably higher by a factor of at least 100 or even by a factor of at least 1000.

Alternatively or in addition, an impedance provided by the first transmission circuit, is, at the given operating frequency, higher than another predetermined first blocking impedance. The aforementioned electrical elements arranged between the output of the receiving device and the input of the electric machine are additionally designed or chosen such that the impedance provided by these elements at the operating frequency/frequencies is higher than the other first blocking impedance. The other first blocking impedance can be equal to the aforementioned first blocking impedance. The first blocking impedance denotes an impedance of the first transmission circuit at a charging frequency and is chosen such that a current flowing from the receiving device to the electric machine is small in the charging mode. The other first blocking impedance also denotes an impedance of the first transmission circuit. The other first blocking impedance, however, is an impedance provided by the first transmission circuit at the give operating frequency and is chosen such that a current flowing from the electric machine to the receiving device is small in a generator mode.

This advantageously allows to minimize a current flow from the inverter to the receiving device during a motor mode and, if applicable, to minimize a current flow from the electric machine to the receiving device during a generator mode. This, in turn, ensures an optimal transfer of electric energy during the motor mode and the generator mode.

In another embodiment, the second transmission circuit comprises a circuit inductive element, wherein an inductance of the circuit inductive elements is chosen such that at the charging frequency, the impedance provided by the second transmission circuit is lower than the predetermined second passing impedance and/or at a given operating frequency, the impedance provided by the second transmission circuit is higher than the predetermined second blocking impedance. The circuit inductive element provides a filter circuit for the electric current flowing from or flowing to the inverter. The circuit inductive element can also be part of the third transmission circuit. The circuit inductive element can be used in a motor mode to decouple a rectangular high frequent alternating current voltage provided by the inverter from the receiving device because a spectrum of this alternating current output voltage can comprise a resonant frequency of the receiving device and could therefore generate a high resonant current. During the design of the electric machine of the proposed electrical power supply system, the inductance of the circuit inductive element has to be considered.

This advantageously allows using a passive inductive element for decoupling the inverter from the receiving device during the motor mode. This also simplifies the design of the second transmission circuit and, in turn, the whole passive electric circuit arrangement.

In another embodiment, the circuit inductive element of the second transmission circuit is also part of the third transmission circuit. Therefore, the circuit inductive element, in particular an inductance of the inductive element, has to be chosen such that the aforementioned requirements of the third transmission circuit at a charging frequency and/or at an operating frequency are met. In particular, the inductance of the circuit inductive element is chosen such that at a given operating frequency, the impedance provided by the third transmission circuit is lower than the predetermined third passing impedance.

The simultaneous usage of the circuit inductive element as a part of second transmission circuit and the third transmission circuit advantageously produces the complexity of the passive electric arrangement and therefore reduces also costs.

In another embodiment, the first transmission circuit comprises a circuit capacitive element, wherein a capacitance of the circuit capacitive element is chosen such that at a charging frequency, the impedance provided by the first transmission circuit is higher than the predetermined first blocking impedance and/or at the operating frequency, the impedance provided by the first transmission circuit is higher than another predetermined first blocking impedance. The circuit capacitive element can be part of the first transmission circuit and simultaneously be part of the third transmission circuit. In this case, the capacitance of the circuit capacitive element can be chosen such that at the operating frequency, the impedance provided by the third transmission circuit is lower than the predetermined third passing impedance. The integration of a circuit capacitive element advantageously allows building the proposed passive circuit arrangement with readily available electrical elements.

In a preferred embodiment, the first transmission circuit comprises a parallel resonant circuit. The aforementioned circuit capacitive element can be part of the parallel resonant circuit. Furthermore, the parallel resonant circuit can comprise an inductive element which is connected in parallel to the capacitive element. The electrical elements of the parallel resonant circuit, e.g. an inductive element and/or a capacitive element, can be chosen such that at the charging frequency, the impedance provided by the first transmission circuit is higher than the predetermined first blocking impedance and, if the parallel resonant circuit is also part of the third transmission circuit, at the operating frequency, the impedance provided by the third transmission circuit is lower than the predetermined third passing impedance. The parallel resonant circuit provides a high impedance in the case of static charging. Thus, there is no or only a minimal current flow from the receiving device to the electric machine during static charging.

In another embodiment, an inductive element of the parallel resonant circuit is a motor inductivity of the electrical machine. An electrical machine such as a synchronous motor or an asynchronous motor comprises a motor inductivity, in particular one inductivity per phase of the electrical machine. This inductive element can be connected in parallel to the aforementioned capacitive element. This advantageously allows building the passive electric circuit arrangement with less electrical elements. In this case, especially if the motor inductivity is fixed or predetermined as a result of motor requirements, the capacitance of the capacitive element is to be chosen such that the parallel resonant circuit provides a high impedance during static charging.

In an alternative embodiment, the first transmission circuit comprises a RC-parallel filter. The RC-parallel filter comprises a capacitive element and an inductive element which is connected in parallel to the inductive element. The RC-parallel filter, however, is connected in series to the electric machine, in particular in series to elements providing the motor inductivity of the electrical machine. The integration of the RC-filter into the first transmission circuit advantageously allows to further minimize a current flow from the receiving device to the electric machine during static charging.

In another embodiment, the capacitive element is also a part of the third transmission circuit. It is also possible that the aforementioned parallel resonant circuit or the aforementioned RC-parallel filter is also part of the third transmission circuit. This advantageously reduces the amount of electrical elements used to build the passive electric circuit arrangement.

In another embodiment, the receiving device comprises at least one inductive element which is formed by an electrically conducting material for producing one phase of the alternating electric current by the electromagnetic induction. The receiving device provides a constant voltage source within the passive electric circuit arrangement during static charging. The constant voltage source means that an effective value or route mean square value of the alternating voltage provided by the receiving device is constant.

The inductive element can be used for the purpose of power factor correction or reactive power correction. In this case, the electrical elements of the first and/or second and/or third transmission circuit can be chosen depending on the inductance of the inductive element of the receiving device. It is also possible that the inductive element of the receiving device is a part of the first and/or the second transmission circuit.

An integration of the inductive element of the receiving device into the first and/or the second transmission circuit or the consideration of the inductive element of the receiving device during the design of the passive electric circuit arrangement advantageously allows to build the passive electric circuit arrangement with less electrical elements and further allows minimizing a current flow from the inverter to the electric machine during static charging.

In another embodiment, the receiving device comprises ad least one further electrical element, which is connected to the inductive element in order to produce one phase of the alternating electric current. The further electrical element can be a capacitive element which is also used for power factor correction or reactive power correction. This advantageously further enhances the quality of an output voltage and/or current of the receiving device during static charging. Also, the further electrical element can be part of the first and/or the second transmission circuit. This advantageously allows building the proposed passive electric circuit arrangement with less electrical elements.

Furthermore, a vehicle comprising one of the previously proposed electric power supply networks is proposed. The vehicle can be track-bound vehicle or a road automobile. In particular, the present invention can be applied to any land vehicle, including, but not preferably, any vehicle which is only temporarily on land, in particular track-bound vehicles such as rail vehicles (e.g. trams), but also to road automobiles such as individual (private) passenger cars or public transport vehicles (e.g. buses including trolley buses which are also track-bound vehicles). Preferably, a primary side conductor arrangement which produces the alternating electromagnetic field is integrated in a track or road of the vehicle so that the electric lines of the primary side conductor arrangement extend in a plane which is nearly parallel to the surface of the road or track on which the vehicle may travel. The receiving device can be located at the underside of a vehicle and may be covered by a ferromagnetic body, such as a body in the shape of a plate. A suitable material is ferrite. The body bundles and redirects the field lines of the magnetic field and therefore reduces the field intensity above the body to nearly zero. However, other configurations, locations and/or orientations of the primary side conductor arrangement are possible.

Furthermore, a method of operating vehicle, in particular a track bound vehicle and/or a road automobile, using electric energy is proposed. In a charging mode, an alternating electromagnetic field is received by a receiving device and is used to produce an alternating electric current by electromagnetic induction. The charging mode is in particular a static charging mode, wherein the vehicle is at a halt or at a rest during static charging. Furthermore, electric energy is transferred from the receiving device to an inverter via a second transmission circuit. The inverter transforms the alternating current generated by the receiving device during (static) charging into a direct current which can be used to charge an energy storage module, e.g. a traction battery of the vehicle.

According to the invention, a transfer of electric energy from the receiving device to the electric machine via a first transmission circuit is blocked by an impedance of the first transmission circuit. The first transmission circuit is part of a passive electric circuit arrangement which connects the receiving device, the inverter and the electric machine.

The frequency of the alternating current of the receiving device during static charging (charging frequency) is e.g. 20 kHz, wherein an impedance of the first transmission circuit is higher than a predetermined first blocking impedance at this charging frequency. As a result, there is no or only minimal current flow from the receiving device to the electric machine during static charging. In particular, the passive electric circuit arrangement which comprises the first transmission circuit is designed such that at the given charging frequency, the impedance provided by the first transmission circuit is higher than the predetermined first blocking impedance and an impedance provided by a second transmission circuit, which is also part of the passive electric circuit arrangement, is lower than a predetermined second passing impedance.

In another embodiment, electric energy is transferred from the inverter to the electric machine or from the electric machine to the inverter via a third transmission circuit in an operating mode. The third transmission circuit is also part of the passive electric circuit arrangement. In a motor mode, electric energy is transferred from the inverter to the electric machine. In this case, a transfer of electric energy from the inverter to the receiving device via the second transmission circuit is blocked by an impedance provided by the second transmission circuit at an operating frequency. In particular, the impedance provided by the second transmission circuit at the operating frequency or at frequencies of an operating frequency interval can be higher than a second blocking impedance.

In a generator mode, electric energy is generated by recuperation and transferred from the electric machine to the inverter. In this case, a transfer of electric energy from the electric machine to the receiving device via the first transmission circuit is blocked by an impedance provided by the first transmission circuit at the operating frequency. In particular, the impedance provided by the first transmission circuit at the operating frequency or at frequencies of an operating frequency interval can be higher than another predetermined first blocking impedance.

This method advantageously allows minimizing a current flow from the inverter to the receiving device in a motor mode or from the electric machine to the receiving device in a generator mode.

Furthermore, a method of manufacturing vehicle, in particular a track bound vehicle and/or a road automobile, is proposed. The method comprises the following steps:
  providing a receiving device adapted to receive an alternating electromagnetic field and to produce an alternating electric current by electromagnetic induction,
  providing an energy storage module,
  providing an inverter,
  providing an electric machine,
  providing a passive electric circuit arrangement such that a given charging frequency, an impedance provided by a first transmission circuit of the passive electric circuit arrangement is higher than a predetermined first blocking impedance and an impedance provided by a second transmission circuit of the passive electric circuit arrangement is lower than a predetermined second passing impedance.

Furthermore, the method comprises the step of electrically connecting the receiving device, the inverter and the electric machine by the passive electric circuit arrangement, wherein the electric circuit arrangement comprises the first transmission circuit for transferring electric energy between the receiving device and the electric machine, the second transmission circuit for transferring electric energy between the receiving device and the inverter, and the third transmission circuit for transferring electric energy between the inverter and the electric machine.

Within such a vehicle, an energy flow during static charging and/or during operation is advantageously directed by the passive electric circuit arrangement which is designed such that during static charging an energy flow from the receiving device to the electric machine is zero or minimized while during an operation of the vehicle, e.g. during an operation in a motor mode or in a generator mode, an energy flow to the receiving device is zero or a minimal.

In another embodiment, the following step is additionally performed:
providing the passive electric circuit arrangement such that a given operating frequency, an impedance provided by the third transmission circuit is lower than a predetermined third passing impedance.

In another embodiment, the following step is additionally performed:
providing the passive electric circuit arrangement such that at the given operating frequency, the impedance provided by the second transmission circuit is higher than a predetermined second blocking impedance and/or the impedance provided by the first transmission circuit is higher than a predetermined another first blocking impedance.

BRIEF DESCRIPTION OF THE DRAWINGS

Examples of the invention will be described with reference to the attached figures in the following.

DETAILED DESCRIPTION OF THE INVENTION

Figure 1:
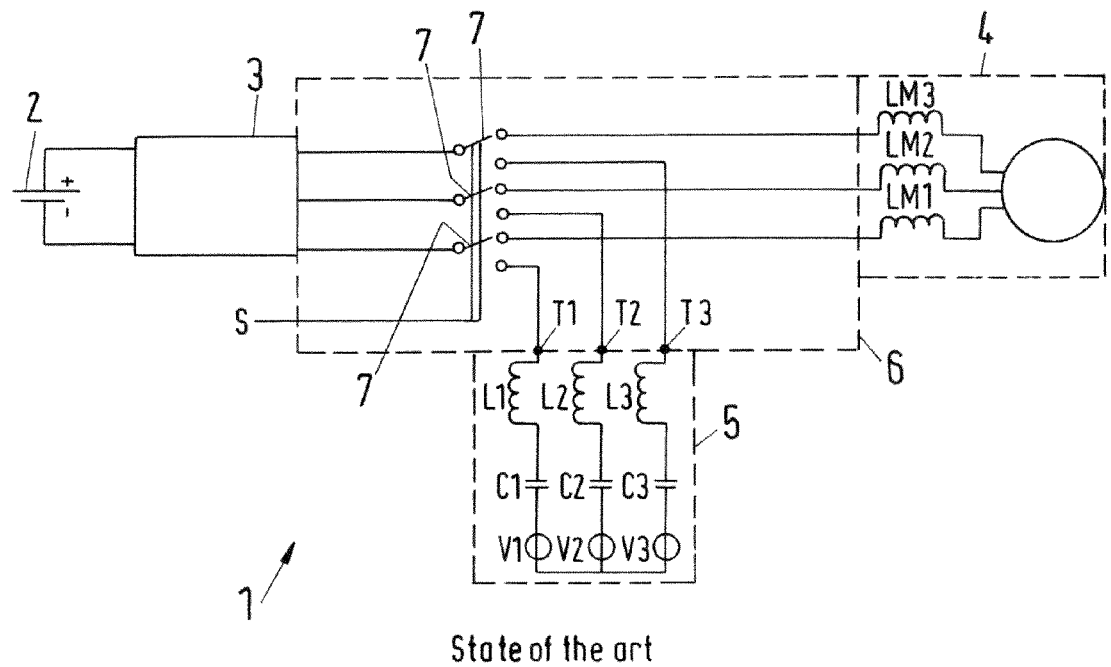
FIG. 1 shows a circuit diagram of an electrical power supply system according to the state of the art.

FIG. 1 shows an electric power supply system 1 of a vehicle (not shown) according to the state of the art. The electric power supply system 1 can be a traction system of the vehicle. The electrical power supply system 1 comprises a traction battery 2, an inverter 3, an electric machine 4 which comprises motor inductive elements LM1, LM2, LM3 representing the motor inductivities. Furthermore, the electrical power supply system 1 comprises a receiving device 5. The receiving device 5 (which can be also referred to as a pickup of the vehicle) is adapted to receive an alternating electromagnetic field and produces an alternating electric current output voltage by electromagnetic induction. Output terminals T1, T2, T3 of the receiving device 5 are also shown in FIG. 1. The receiving device comprises voltage sources V1, V2, V3 producing or generating an alternating current voltage by electromagnetic induction. Furthermore, the receiving device 5 comprises capacitive elements C1, C2, C3 and inductive elements L1, L2, L3 which are connected in series respectively.

FIG. 1 shows a 3-phase-network comprising three phases. For example, a first voltage source V1, a first capacitive element C1 and first inductive element L1 of the receiving device 5 generate an alternating current output voltage of a first phase. The electrical power supply system 1 further comprises an active electric circuit arrangement 6. The active electric circuit arrangement 6 is adapted to connect the inverter 3, the electric machine 4, and the receiving device 5. The active electric circuit arrangement 6 comprises three switches 7, one switch 7 per phase. These switches 7 are active elements which means that external energy is used to operate these switches 7. In a first position of the switches 7, an electric connection between the inverter 3 and the electric machine 4 is provided. In a second position of the switches 7, an electric connection between the inverter 3 and the receiving device 5 is provided (not shown in FIG. 1). The switches can e.g. be field-effect-transistors such as MOSFETs. In this case, the switches 7 can be operated by controlling a control voltage, e.g. a gate-source-voltage of the MOSFETs. Also shown is a steering or control signal S of the switches 7. The control signal S can be a frequency dependent control signal S. At a charging frequency of e.g. 20 kHz, the control signal S controls the switches 7 such that the switches 7 are in the second position (static charging). At an operating frequency up to 10 kHz, the control signal S controls the switches 7 such that the switches 7 are in the first position (operation mode).

Figure 2:
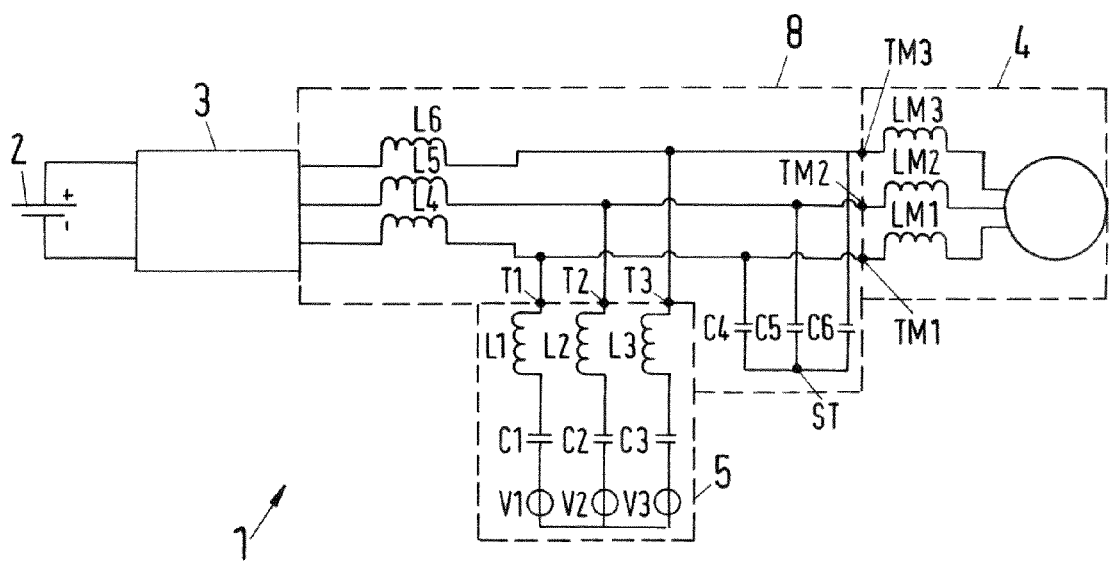
FIG. 2 shows a circuit arrangement of an electric power supply system according to a first embodiment of the invention.

FIG. 2 shows a circuit diagram of a 3-phase electrical power supply system 1 according to a first embodiment of the invention. Regarding the electrical elements such as the traction battery 2, the inverter 3, the electric machine 4 and the receiving device 5, it can be referred to the description of FIG. 1. With respect to the receiving device 5, the series connection of the capacitive elements C1, C2, C3 and the inductive elements L1, L2, L3 are used for power factor correction or reactive power compensation. Also, the receiving device 5 provides an alternating current output voltage with a constant effective value or RMS value.

In contrast to the electrical power supply system 1 shown in FIG. 1, the electrical power supply system 1 of FIG. 2 comprises a passive electric circuit arrangement 8.

The passive electric circuit arrangement 8 comprises circuit inductive elements L4, L5, L6, in particular one circuit inductive element L4, L5, L6 per phase. The circuit inductive elements L4, L5, L6 are electrically arranged between the output terminals T1, T2, T3 of the receiving device 5 and the inverter 3. Furthermore, the passive electric circuit arrangement 8 comprises circuit capacitive elements C4, C5, C6. One terminal of the circuit capacitive elements C4, C5, C6 is electrically connected to the output terminals T1, T2, T3 of the receiving device 5. The other terminals of the circuit capacitive elements C4, C5, C6 are connected in a star point ST. One circuit capacitive element C4, C5, C6 is assigned to each phase of the 3-phase-system. In particular, the circuit capacitive elements C4, C5, C6 are arranged in parallel to input terminals TM1, TM2, TM3 of the electric machine 4. Motor inductive elements LM1, LM2, LM3 and the circuit capacitive elements C4, C5, C6 respectively provide a parallel resonant circuit.

With respect to the output terminals T1, T2, T3, a first transmission circuit which is part of the passive electric circuit arrangement 8 comprises the parallel resonant circuit provided by the circuit capacitive elements C4, C5, C6 and the motor inductive elements LM1, LM2, LM3. Again with respect to the output terminals T1, T2, T3, a second transmission circuit which is also part of the passive circuit arrangement 8 comprises the circuit inductive elements L4, L5, L6. A third transmission circuit, which is also part of the passive electric circuit arrangement 8, comprises the circuit inductive elements L4, L5, L6 and the aforementioned parallel resonant circuit provided by the circuit capacitive elements C4, C5, C6 and the motor inductive elements LM1, LM2, LM3.

According to the invention, the capacitances of the circuit capacitive elements C4, C5, C6 and the inductances of the motor inductive elements LM1, LM2, LM3 are chosen such that at a charging frequency of 20 kHz the impedance provided by the first transmission circuit is higher than a first blocking impedance. Simultaneously, the inductances of the circuit inductive elements L4, L5, L6 are chosen such that at the charging frequency, the impedance provided by the second transmission circuit is lower than a predetermined second passing impedance. In addition, the inductances of the motor inductive elements L4, L5, L6, the capacitances of the circuit capacitive elements C4, C5, C6, and the inductances of the motor inductive elements LM1, LM2, LM3 are chosen such that at an operating frequency with a range from 0 kHz up to 10 kHz, an impedance provided by the third transmission circuit is lower than a third passing impedance. The inductances of the circuit inductive elements L4, L5, L6 have to be chosen such that an impedance of the second transmission circuit is higher than a second blocking impedance at the operating frequency. Also, the capacitances of the circuit capacitive elements C4, C5, C6 and the inductances of the motor inductive elements LM1, LM2, LM3 have to be chosen such that an impedance of the first transmission circuit is higher than another first blocking impedance at the operating frequency.

The shown electrical power supply system 1 advantageously allows controlling or directing a energy flow or current flow between the inverter 2, the receiving device 5, and the electric machine 4 passively, e.g. without using additional active elements such as switches 7 (see FIG. 1) or power switches. The control of the energy flow or current flow is controlled by the design and the electrical elements of the passive electric circuit arrangement 8. In a motor mode, electric energy is transferred from the traction battery 2 to the electric machine 4 via the inverter 3. The inverter 3 generates an alternating current output voltage with an operating frequency up to 10 kHz which can be a square wave voltage. Because of the series connection of the circuit inductive elements L4, L5, L6 and the motor inductive elements LM1, LM2, LM3 this square wave voltage and the resulting square wave currents are transformed to a nearly sinusoidal current. The circuit inductive elements L4, L5, L6 are also used to decouple the output voltage of the inverter in the operating mode, e.g. the square wave voltage, from the receiving device 5.

In the case of an inductive charging with the vehicle at a halt (static charging), the electric energy is transferred from the receiving device 5 to the inverter 3. The receiving device 5 comprises the aforementioned inductive elements L1, L2, L3 and the capacitive elements C1, C2, C3 which can be also referred to as compensation capacitors. These electrical elements and the circuit inductive elements L4, L5, L6 form a series resonant circuit with a predetermined transmission frequency. During static charging, a part of the output voltage of the receiving device 5 falls across the input terminals TM1, TM2, TM3 of the electric machine 4. The parallel resonant circuit formed by the circuit capacitive elements C4, C5, C6 and the motor inductive elements LM1, LM2, LM3 provides a high impedance for voltages within a frequency range of the charging frequency. Thus, there is no or only a minimal current flow to the electric machine 4.

If, during operation of the vehicle in a motor mode, the electric energy is transferred from the inverter 3 to the electric machine 4, an electric current is free to flow from the inverter 3 to the electric machine 4 as the parallel resonant circuit is not operated at its resonant frequency. Simultaneously, there is no or only minimal transfer of electric energy from the inverter 3 to the receiving device 5 because of the aforementioned series resonant circuit.

Some frequencies of the output voltage of the inverter 3 operated in a motor mode which are in particular within a range of the resonant frequency of the series resonant connection can generate a resonant current in the receiving device 5. The circuit inductive elements L4, L5, L6 are minimizing this effect. During breaking of the vehicle, e.g. during recuperation, the vehicle can be operated in generator mode. The output voltage generated by the electric machine 4 in the generator mode is an sinusoidal output voltage and has a lower frequency than the resonant frequency of the receiving device 5. Thus, there will be no or only a minimal current flow from the electric machine 4 to the receiving device 5. Simultaneously, however, an energy flow from the electric machine 4 to the inverter 3 is undisturbed.

It is clear that a sufficient frequency spacing of the resonant frequency of the respective transmission circuits has to be provided for a correct functioning of the proposed invention.

Figure 3:
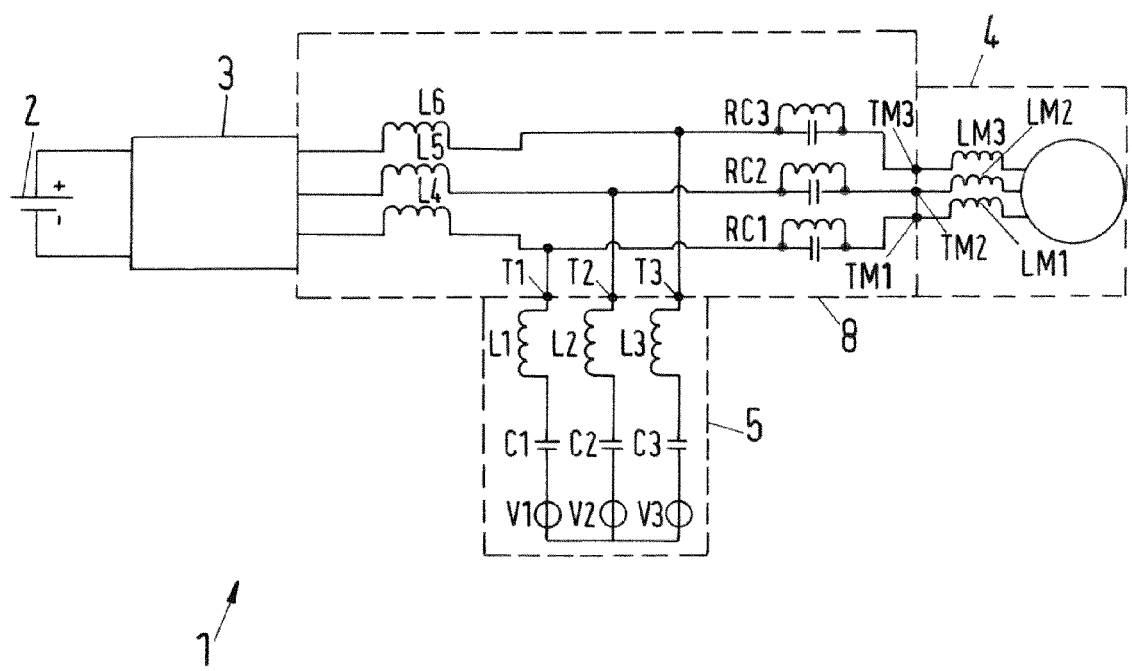
FIG. 3 shows a circuit diagram of an electric power supply system according to a second embodiment of the invention.

In FIG. 3, an alternative embodiment of an electrical power supply system 1 is shown. Instead of the parallel resonant circuit comprising a circuit capacitive element C4, C5, C6 (see FIG. 2) and motor inductive elements LM1, LM2, LM3, the passive electric circuit arrangement 8 comprises RC-parallel filters RC1, RC2, RC3, which are electrically arranged between output terminals T1, T2, T3 of the receiving device 5 and input terminals TM1, TM2, TM3 of the electric machine 4. Simultaneously, the RC-parallel filters RC1, RC2, RC3 are arranged between the inverter 3 and the electric machine 4 in series to the circuit inductive elements L4, L5, L6. The RC-parallel filters RC1, RC2, RC3 are a part of the first transmission circuit and the third transmission circuit of the passive electric circuit arrangement 8. Each RC-parallel filter RC1, RC2, RC3 comprises a capacitive element and an inductive element which is connected in parallel to the capacitive element.

It is shown that the RC-parallel filters RC1, RC2, RC3 are exclusively part of the passive electric circuit arrangement 8 and not an element of the electric machine 4. Also there is one RC-parallel filter RC1, RC2, RC3 per phase of the 3-phase-system. The proposed design of the passive electric circuit arrangement 8 advantageously allows to further minimize the flow of electric current from the receiving device 5 to the electric machine 4 during static charging while allowing the flow of electric current between the inverter 3 and the electric machine 4 during an operation mode, e.g. an operation in motor mode or a generator mode.

The invention claimed is:

1. An electrical power supply system of a vehicle, wherein the electrical power supply system comprises:
   an inverter,
   an electric machine,
   a receiving device adapted to receive an alternating electromagnetic field and to produce an alternating electric current by electromagnetic induction, and
   a passive electric circuit arrangement adapted to connect the inverter, the electric machine, and the receiving device, wherein the passive electric circuit arrangement comprises:
      a first transmission circuit for transferring electric energy between the receiving device and the electric machine,
      a second transmission circuit for transferring electric energy between the receiving device and the inverter, and
      a third transmission circuit for transferring electric energy between the inverter and the electric machine, wherein the passive electric circuit arrangement is designed such that at a charging frequency, an impedance of the first transmission circuit at the charging frequency is higher than a predetermined first blocking impedance and an impedance of the second transmission circuit at the charging frequency is lower than a predetermined second passing impedance, whereupon electrical energy is transferred from the receiving device to the inverter, and transfer of electrical energy from the receiving device to the electrical machine is blocked.

2. The power supply system according to claim 1, wherein the passive electric circuit arrangement is designed such that at an operating frequency, an impedance of the third transmission circuit is lower than a predetermined third passing impedance.

3. The power supply according to claim 2, wherein the passive electric circuit arrangement is designed such that at the operating frequency, an impedance of the second transmission circuit is higher than a predetermined second blocking impedance and/or an impedance of the first transmission circuit is higher than another predetermined first blocking impedance.

4. The power supply according to claim 1, wherein the second transmission circuit comprises a circuit inductive element (L4, L5, L6), wherein an inductance of the circuit inductive element (L4, L5, L6) is chosen such that at the charging frequency, the impedance of the second transmission circuit is lower than the predetermined second passing impedance and/or at an operating frequency, the impedance of the second transmission circuit is higher than a predetermined second blocking impedance.

5. The power supply according to claim 4, wherein the circuit inductive element (L4, L5, L6) of the second transmission circuit is also part of the third transmission circuit.

6. The power supply according to claim 1, wherein the first transmission circuit comprises a circuit capacitive element (C4, C5, C6), wherein a capacitance of the circuit capacitive element (C4, C5, C6) is chosen such that at the charging frequency, the impedance of the first transmission circuit is higher than the predetermined first blocking impedance and/or at an operating frequency, the impedance of the first transmission circuit is higher than another predetermined first blocking impedance.

7. The power supply according to claim 6, wherein the first transmission circuit comprises a parallel resonant circuit.

8. The power supply according to claim 7, wherein an inductive element of the parallel resonant circuit is a motor inductivity of the electrical machine.

9. The power supply according to claim 6, wherein the first transmission circuit comprises an inductive-capacitor parallel filter (RC1, RC2, RC3).

10. The power supply according to claim 6, wherein the circuit capacitive element (C4, C5, C6) is also part of the third transmission circuit.

11. The power supply according to claim 1, wherein the receiving device comprises at least one inductive element (L1, L2, L3) which is formed by an electrically conducting material for producing one phase of the alternating electric current by the electromagnetic induction.

12. The power supply according to claim 11, wherein the receiving device comprises at least one further electrical element, which is connected to the inductive element (L1, L2, L3) in order to produce one phase of the alternating electric current.

13. A vehicle comprising the electric power supply network of claim 1.

14. A method of operating a vehicle, using electric energy, comprising a charging mode wherein:
an alternating electromagnetic field operating at a charging frequency is received by a receiving device and is used to produce an alternating electric current by electromagnetic induction,
electric energy at the charging frequency is transferred from the receiving device to an inverter via a second transmission circuit, and
a transfer of electric energy at the charging frequency from the receiving device to an electric machine via a first transmission circuit is blocked by an impedance of the first transmission circuit.

15. The method of claim 14, further comprising an operating mode wherein:
electric energy is transferred from the inverter to the electric machine or from the electric machine to the inverter via a third transmission circuit,
a transfer of electric energy from the inverter to the receiving device via the second transmission circuit is blocked by an impedance of the second transmission circuit, and/or
a transfer of electric energy from the electric machine to the receiving device via the first transmission circuit is blocked by an impedance of the first transmission circuit.

16. A method of manufacturing a vehicle comprising:
providing a receiving device adapted to receive an alternating electromagnetic field and to produce an alternating electric current by electromagnetic induction,
providing an inverter,
providing an electric machine,
providing a passive electric circuit arrangement such that at a charging frequency, an impedance of a first transmission circuit of the passive electric circuit arrangement at the charging frequency is higher than a predetermined first blocking impedance and an impedance of a second transmission circuit of the passive electric circuit arrangement at the charging frequency is lower than a predetermined second passing impedance whereupon electrical energy is transferred from the receiving device to the inverter, and transfer of electrical energy from the receiving device to the electrical machine is blocked, and
electrically connecting the receiving device, the inverter, and the electric machine by the passive electric circuit arrangement, wherein the passive electric circuit arrangement comprises the first transmission circuit for transferring electric energy between the receiving device and the electric machine, the second transmission circuit for transferring electric energy between the receiving device and the inverter, and a third transmission circuit for transferring electric energy between the inverter and the electric machine.

17. The method of claim 16, further comprising:
providing the passive electric circuit arrangement such that at an operating frequency, an impedance of the third transmission circuit is lower than a predetermined third passing impedance.

18. The method of claim 17, further comprising:
providing the passive electric circuit arrangement such that at the operating frequency, an impedance of the second transmission circuit is higher than a predetermined second blocking impedance and/or an impedance of the first transmission circuit is higher than another predetermined first blocking impedance.

* * * * *